Feb. 2, 1937. T. A. RICH 2,069,625
CONTROL DEVICE
Filed May 17, 1935

Inventor:
Theodore A. Rich,
by Harry E. Dunham
His Attorney.

Patented Feb. 2, 1937

2,069,625

UNITED STATES PATENT OFFICE 2,069,625

CONTROL DEVICE

Theodore A. Rich, Schenectady, N. Y., assignor to General Electric Company, a corporation of New York Application May 17, 1935, Serial No. 21,968

7 Claims. (Cl. 200—122)

My invention relates to control devices, and more particularly to control devices of the type in which desired control operations are selectively effected in response to current impulses of different duration.

One form of control device of the above-indicated type comprises a control element which is actuated to different positions through the cooperation of a plurality of thermal responsive elements which are connected together and arranged to respond to current impulses of different predetermined intervals. It has been found that in a device of this type the fluctuations in the temperature of the thermal responsive elements due to changes in the temperature of the media surrounding the device cause substantial variations in the lengths of the current impulse periods necessary to effect the desired operations.

It is, therefore, an object of my invention to provide in a control device of the type indicated a temperature compensating arrangement whereby the lengths of the predetermined current impulse intervals necessary to effect the control operations are substantially unaffected as the temperature of the media surrounding the device varies through wide ranges.

More specifically, it is an object of my invention to provide in a device of the above type a single thermostatic element which functions to make the lengths of the current impulse periods necessary to effect the desired control operations substantially independent of ambient temperature fluctuations.

The novel features which I believe to be characteristic of my invention are set forth with particularity in the appended claims. My invention itself, however, both as to its organization and the method of operation together with further objects and advantages thereof will best be understood by reference to the following specification taken in connection with the accompanying drawing, in which Figs. 1 and 2 represent an embodiment of my invention.

Figure 1:
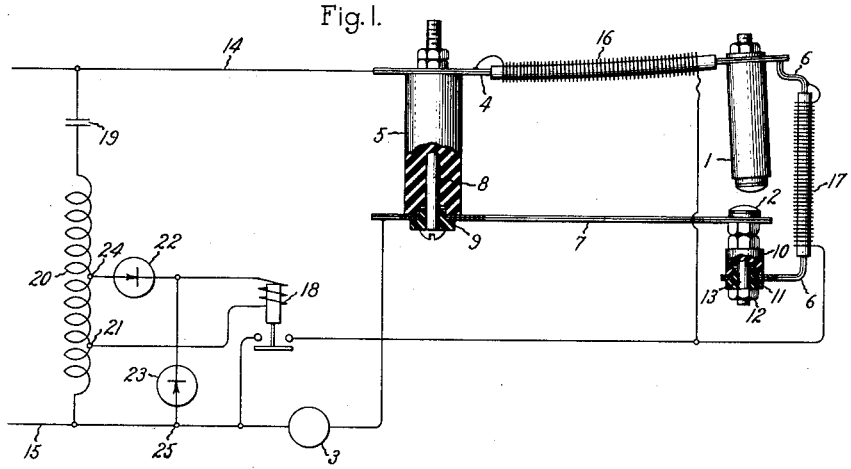
Figure 2:
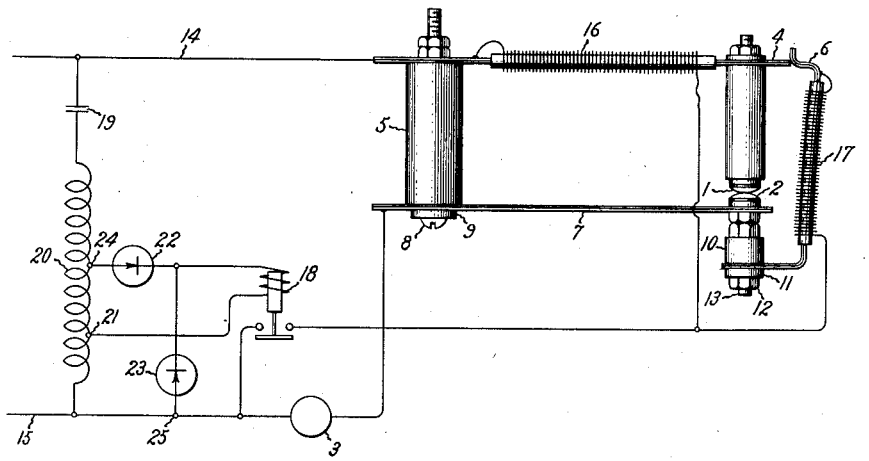

Referring to Fig. 1 of the drawing I have shown my improved control device in which a switch comprising a pair of contacts 1 and 2 is arranged to be opened and closed in selective response to impulses of different durations. In Fig. 1 this switch is shown in its open position, whereas in Fig. 2 it is shown in its closed position. The contacts 1 and 2 are connected in circuit with a load device 3 which may comprise, for example, a water heater, a lamp, or any other device which it is desired to control from a remote point. The element or contact 1 is mounted on the free end of a thermostatic element 4 having its other end fixedly mounted on a support 5. The contact 2 and a second thermostatic element 6 are mounted on the free end of a third thermostatic element 7 having its other end fixedly mounted on the support 5. The three thermostatic elements 4, 6 and 7 are of the bimetallic type which is quite well known in the art. I have shown the thermostatic elements 4 and 7 as rigidly connected to the support 5 by means of a bolt 8 extending through the supporting member and insulated from the element 7 by a washer 9 made of insulating material. It will, of course, be understood that any other suitable mounting arrangement may be employed. The thermostatic element 6 is insulated from the element 7 by the two blocks of insulating material 10 and 11 and is retained in position on the free end of the element 7 by an assembly comprising the nut 12 threaded on the stem 13 of the contact 2. As thus arranged the load circuit includes the load 3, thermostatic element 7, contacts 1 and 2 and the thermostatic element 4 connected between a pair of supply lines 14 and 15.

With this arrangement the current flowing through the load circuit should be maintained at a value sufficiently low to prevent appreciable heating of the thermostatic elements 4 and 7, for otherwise the compensating action of the element 7 as described hereinafter will be undesirably affected.

A pair of heating coils 16 and 17 are provided for heating respectively the thermostatic elements 4 and 6. The heating coils 16 and 17 are arranged to be connected across a source of current as, for example, across the lines 14 and 15, and are normally connected in parallel through the point of engagement between the free ends of the thermostatic elements 4 and 6. However, when the engagement between the two ends of the two elements is broken the parallel connection is interrupted and the coil 17 is isolated from the supply source.

The elements 4 and 6 are so positioned that with the element 4 heated and the element 6 cool, the element 6 assumes a normal position such that the free end thereof is beneath the free extremity of the element 4. Assuming these conditions are met and the element 4 is allowed to cool, the latter element starts to return to its unflexed position but is retained in a flexed position, as shown in Fig. 1, by the engagement with the upper end of the element 4. If now the element 6 be heated, the upper free extremity thereof moves to the right from beneath the free extremity of the element 4 thereby permitting the latter element quickly to assume substantially its normal position, as shown in Fig. 2, whereby the contacts 1 and 2 are moved into engagement with a snap action.

It is desirable in certain applications to control the operation of the above described device by means of high frequency current impulses transmitted over the power lines 14 and 15. To this end a relay 18 is provided having contacts arranged in the circuit of the heating coils 16 and 17. The relay 18 is energized by received high frequency current impulses which are impressed on a tuned circuit consisting of a condenser 19 and an inductance 20. One side of the winding of the relay 18 is connected to a point 21 on inductance 20 and the other side of the windings is connected through rectifiers 22 and 23 respectively to the points 24 and 25 on either side of the point 21 of the inductance 20. The rectifiers 22 and 23 are so polarized that unidirectional current is supplied through the relay winding 18 during both half cycles of the alternating current appearing on the inductance 20. These rectifiers may be of any suitable construction although preferably are of the copper oxide type as shown for example, in Patent No. 1,640,335, to Lars O. Grondahl, issued August 23, 1927.

As thus arranged the operation of the device is as follows: Assuming that the elements of the mechanism are in the position shown in Fig. 1, and that a high frequency current impulse of short duration as, for example, 5 seconds, is received over the lines 14 and 15, the relay winding 18 is energized to close the heating circuit consisting of the parallel connected heating coils 16 and 17. Energization of the coil 17 causes an immediate flexure of the element 6 toward the right. The heat generated by the coil 16 also has a tendency to flex the element 4 upwardly but due to the flexed condition of the element 4 in this position and the short duration of the impulse only a slight flexure thereof due to the heat applied results before the upper end of the element 6 moves from beneath the free end of the element 4 to permit the element 4 to snap to a substantially unflexed position and thereby close the contacts 1 and 2 in the manner illustrated in Fig. 2. The duration of the short impulse necessary to effect this operation is so calibrated that only a slight flexing of the element 4 is effected before the tripping action is obtained. Upon a cessation of the short high frequency impulse the relay 18 is deenergized thereby opening the heating circuit including the coils 16 and 17.

With the contacts 1 and 2 in the closed circuit position shown in Fig. 2, if it be desired to open the contacts, a high frequency impulse of predetermined longer duration is transmitted over the power lines 14 and 15, thereby energizing the relay winding 18 to close the circuit of the heating coils 16 and 17. As the elements 4 and 6 become heated under the influence of the coils 16 and 17, the element 4 moves upwardly and the element 6 to the right until the free extremities thereof are disengaged and the circuit through the coil 17 is broken. However, the circuit through the coil 16 remains uninterrupted and element 4 continues to move upwardly while the element 6 cools and returns to its unflexed position beneath the outer extremity of the element 4. When the predetermined long current impulse is complete the circuit through the heating coil 16 is broken and the element 4 starts to move downward to its normal unflexed position but in so doing the right-hand extremity thereof encounters the free end of the element 6 and the parts are retained in the original position as shown in Fig. 1.

From the foregoing description it will readily be seen that the thermostatic elements 4 and 6 are susceptible to flexure under ambient temperature changes, and that such flexure will cause relative movement between the free extremities thereof in either of the two positions shown unless suitable compensation be provided. Such relative movement is highly undesirable since it causes very marked changes in the lengths of the predetermined current impulse periods necessary to effect the selective operations.

In accordance with my invention the thermostatic element 7 which carries the contact 2 and the element 6 functions to compensate for the effects of ambient temperature variations on the lengths of the impulse periods necessary to effect the operation of the contact 1 between either of its two positions. The free end of the element 7 is arranged to move equal distances in the same direction as the free end of the element 4 under like changes of the ambient temperature. Thus, it will be seen that with the mechanism in the position as shown in Fig. 1, if the ambient temperature rises, the elements 4 and 7 will be flexed upwardly and the element 6 will be flexed to the right. During this simultaneous movement of the three elements the free end of the element 6 is moved in a counterclockwise direction to counteract the movement of the free extremity thereof to the right, and is also bodily moved upwardly to compensate for the movement of the element 4 away from the upper end thereof. Conversely, if the ambient temperature decreases, the compensating element 7 moves the free end of the element 6 in a clockwise direction and at the same time moves it downwardly, thereby to compensate for the flexure of the element 4 downwardly and the flexure of the element 6 to the left. In this manner the point of engagement between the free ends of the elements 4 and 6 remains the same irrespective of ambient temperature changes, and the impulse interval necessary to cause disengagement of the free ends is rendered substantially independent of such changes.

With the elements in the position shown in Fig. 2 the compensating operation of the thermostatic element 7 is exactly the same as is described above in connection with Fig. 1. That is, the free end of the element 7 moves under ambient temperature changes to prevent substantial relative movement between the free extremities of the elements 4 and 6. The importance of compensation of the elements in this position will be appreciated when it is understood that in the absence of compensating means, if the ambient temperature were increased sufficiently the upper end of the element 6 would be deflected to the right to a position such that the free end thereof could not engage the end of the element 4, and, therefore, the operation of the device from the position shown in Fig. 2 to the position shown in Fig. 1 could not be obtained. In addition, as the ambient temperature increased the free end of the element 4 would tend to move upward thereby to reduce the contact pressure between the contacts 1 and 2. It is also obvious that if this temperature rise were sufficient, the engagement between the two contacts would be broken.

Furthermore, with the device calibrated for a definite reset interval at a particular temperature and no compensating means provided, the reset interval increases as the ambient temperature decreases below the calibrating temperature. However, by arranging the element 7 in the manner described the contacts are maintained in positive engagement with an even contact pressure through wide ranges of ambient temperature fluctuations. In addition, relative movement between the free ends of the elements 4 and 6 is prevented, thereby insuring a positive operation of the mechanism from the position shown in Fig. 2 to the position shown in Fig. 1, when a current impulse having a duration equal to that for which the device is calibrated, is impressed on the heating coil circuit.

The importance of the compensation to render the length of the tripping interval of short duration substantially unaffected by ambient temperature changes is emphasized by a consideration of the effect of extreme cooling of the device. Thus, if the device be operating without compensating means and be calibrated to trip after a predetermined current impulse interval at a particular temperature, and the ambient temperature is decreased to a value substantially lower than the particular temperature at which the device was calibrated, the heating interval necessary to produce the tripping action will be increased and the duration of the impulse interval previously determined may be insufficient to produce the tripping action.

From the foregoing description it will be apparent that I have devised a control device which is of economic structure, is positive in operation, and which is substantially unaffected in its operation by variations in the ambient temperature. It will further be seen that in my improved device a single thermostatic element performs all of the compensating functions necessary to obtain an accurate, positive and reliable operation of the device under all temperature conditions. An additional advantage of the construction shown is found in the arrangement whereby the contacts 1 and 2 move relatively to each other when in engagement during ambient temperature changes thereby to produce a wiping action therebetween. This action prevents fusion between the contacts due to the current flowing therethrough and maintains the same clean at all times.

While I have described what I consider to be the preferred embodiment of my invention, it will readily be understood by those skilled in the art that I do not wish to be limited thereto since many modifications in the structure may be made, and I contemplate by the appended claims to cover all such modifications as fall within the true spirit and scope of my invention.

What I claim as new and desire to secure by Letters Patent in the United States is:

1. In combination, a control element reciprocally operable between two positions, means including a thermally responsive element for moving said element from the second to the first of said positions when said thermally responsive element is heated for a predetermined interval, a second thermally responsive element for restraining said first thermally responsive element in said first position, said second thermally responsive element being movable when heated for an interval shorter than said first interval to permit said thermally responsive element to move said control element from said first to said second position, and means for preventing substantial variations in the heating intervals necessary to effect such movements of said control element during ambient temperature changes.

2. In combination, a control element reciprocally operable between two positions, means including a thermally responsive element for moving said control element from the second to the first of said positions when said element is heated for a predetermined interval, a second thermally responsive element for restraining said first thermally responsive element in said first position, said second thermally responsive element being movable when heated for an interval shorter than said first interval to permit said first thermally responsive element to move said control element from said first to said second position, and a third thermally responsive element having a free end upon which is mounted said second thermally responsive element, said third thermally responsive element being operative to prevent substantial variations in the heating intervals necessary to cause said movements of said control element when the environment temperature is changed from one value to another value.

3. In combination, an element operable between two positions, a plurality of thermally responsive elements for actuating said element between said positions when selectively heated for different intervals, and means for preventing substantial variations in the lengths of said intervals necessary to produce such actuation during ambient temperature changes.

4. In combination, a pair of thermostatic elements each having a free end, cooperating switch contacts mounted respectively on the free ends of said elements, and means including a third thermostatic element mounted on and wholly supported by one of said pair of elements for causing relative movement between said contacts.

5. In combination, a pair of relatively movable thermostatic elements, a third thermostatic element relatively movable with respect to one of said pair of elements, said third thermostatic element being arranged to prevent substantially relative movement between portions of said pair of elements during changes in the environment temperature, and means controlled by the relative movement between said third element and said one of said pair of elements.

6. In a control device, a thermostatic element, a contact mounted on said element and reciprocally operable between two positions, a second thermostatic element having a free end movable relative to said first element when heated, a third thermostatic element for preventing substantial relative movement between said first element and the free end of said second element during changes in the environment temperature, and a second contact mounted on said third thermostatic element and arranged to engage said first contact in one position of said first contact.

7. In combination, a thermostatic element, a second thermostatic element having a free end engaging said first element to retain said first element in a flexed condition and arranged to move when heated to release said first element thereby to allow said element to assume an unflexed position, means for heating said second element to cause such movement, means for maintaining the point of engagement between said elements substantially unchanged during ambient temperature fluctuations, and means for utilizing the movement of said first element between said flexed and unflexed positions to effect a control operation.

THEODORE A. RICH.